United States Patent
Manni et al.

(10) Patent No.: US 10,501,138 B2
(45) Date of Patent: Dec. 10, 2019

(54) ARRANGEMENT FOR HOLDING A DEVICE ATTACHED TO A HANDLEBAR

(71) Applicant: Suunto Oy, Vantaa (FI)

(72) Inventors: Jukka Manni, Vantaa (FI); Tuomas Reivo, Vantaa (FI); Mikko Sepänniitty, Vantaa (FI); Ossi Lehtinen, Vantaa (FI); Arto Komulainen, Vantaa (FI)

(73) Assignee: Suunto Oy, Vantaa (FI)

( * ) Notice: Subject to any disclaimer, the term of this patent is extended or adjusted under 35 U.S.C. 154(b) by 0 days.

(21) Appl. No.: 15/992,266

(22) Filed: May 30, 2018

(65) Prior Publication Data
US 2018/0346048 A1    Dec. 6, 2018

(30) Foreign Application Priority Data

Jun. 1, 2017 (FI) ...................................... 20175493
Jun. 1, 2017 (GB) .................................... 1708752.9

(51) Int. Cl.
*B62J 11/00* (2006.01)
*F16M 13/02* (2006.01)

(52) U.S. Cl.
CPC .............. *B62J 11/00* (2013.01); *F16M 13/02* (2013.01)

(58) Field of Classification Search
CPC .... B62J 11/00; B62J 6/00; B62H 5/00; B60R 9/08
USPC ....................................................... 224/420
See application file for complete search history.

(56) References Cited

U.S. PATENT DOCUMENTS

| | | | | |
|---|---|---|---|---|
| 4,176,770 A | * | 12/1979 | Griggs | ...................... B62J 11/00 215/383 |
| 4,541,555 A | * | 9/1985 | Miree | ......................... B62J 6/00 224/420 |
| 4,819,217 A | * | 4/1989 | Houlihan | ........... G04B 37/1413 368/10 |
| 4,887,249 A | | 12/1989 | Thinesen | |
| 5,395,018 A | * | 3/1995 | Studdiford | ............... B62H 5/00 224/420 |

(Continued)

FOREIGN PATENT DOCUMENTS

DE     202004007093 U1     8/2004
FR            2707242 A3     1/1995
WO     WO2014146151 A1     9/2014

*Primary Examiner* — Brian D Nash
(74) *Attorney, Agent, or Firm* — Seppo Laine Oy

(57) ABSTRACT

The invention relates to arrangements for holding a wristband device attached to a handlebar, such as a bicycle handlebar. The arrangement comprises a holder and a strap of a stretchable material forming an elastic strap loop. The holder comprises a plate-like middle portion having a flat surface on the top side to support the housing of said electronic device, and a first recess on the opposite bottom side for interfacing with a handlebar. It also comprises first and second bent outer portions attached to opposite ends of said middle portion adapted to support at least part of said wristband of said electronic device, and a pair of second recesses formed on the top side of said middle portion at its opposite ends between the middle portion and said outer portions, respectively. The holder is attached to the handlebar with the first recess mating with the handlebar and the elastic strap loop wrapped around the handlebar with a first end fitted in a first recess and the other end of said strap fitted in the second recess of said pair of second recesses.

5 Claims, 2 Drawing Sheets

(56) References Cited

U.S. PATENT DOCUMENTS

| | | | | |
|---|---|---|---|---|
| 5,673,889 | A * | 10/1997 | DeValcourt | B60R 9/08 224/319 |
| 5,761,157 | A * | 6/1998 | Takeda | G04B 37/1413 368/10 |
| 6,843,456 | B1 * | 1/2005 | Hajianpour | B62J 11/00 224/414 |
| 7,077,302 | B2 * | 7/2006 | Chuang | B62J 11/00 224/271 |
| 8,348,296 | B2 * | 1/2013 | Taiga | B62J 11/00 224/420 |
| 9,963,183 | B2 * | 5/2018 | Karl | B62J 11/00 |
| 2007/0247858 | A1 | 10/2007 | Ford | |
| 2011/0051340 | A1 | 3/2011 | Onnela et al. | |
| 2016/0207581 | A1 | 7/2016 | Cheng | |

\* cited by examiner

ARRANGEMENT FOR HOLDING A DEVICE ATTACHED TO A HANDLEBAR

FIELD OF THE INVENTION

The present invention pertains to arrangements for holding a device attached to a handlebar, such as a bicycle handlebar. More specifically, the arrangement is aimed at devices provided with a wristband, such as wristop computers.

BACKGROUND OF THE INVENTION

In most sport disciplines, various portable devices are offered which monitors the performance and/or the physical condition of the user. Such devices include wearable computers provided with a GPS sensor or having connection to GPS sensors, accelerometers, heart rate sensors, EMG sensors, and so forth. Primarily such devices are worn on the wrist, and are called wristop computers, smart watches, sports watches, heart rate monitors, etc. The user may the follow developments of his/her performance conveniently by glancing at the device on the wrist. However in some sports, watching a small display on your wrist is not possible without interfering with the performance. In competition sports, perhaps the most extreme example of such a discipline is swimming. Another example is bicycling, where generally both hands must be firmly gripping the handlebar, in order to keep the momentum of the performance intact.

One way of avoiding this problem is to attach the wristop computer to the handlebar. For that purpose, a variety of attachment accessories have been developed. Obviously, the attachment needs to firmly keep the watch or wristop computer on the handlebar in a position where the display is viewable with a glance. Other conceivable sports disciplines are motorcycling, watersports such as jet-ski riding, windsurfing, or waterskiing, or any other sport where a firm grip with both hands on the vehicle or equipment is needed, and where a bar may be provided in the line of sight of the user that is suitable for carrying a wristop computer.

Handlebar attachment accessories for the wristop computers usually involve clamps that need to be tightened to the bar by screws or some other adjustable means fastened by screwing. Alternatively, the accessory may be one integral piece which is pressed by force onto the handlebar. In most of the cases, the wristop computer is held in place by its own wristband, which is tightly strapped around the accessory on the handlebar.

The problems involved with known handlebar accessories relate to tedious fastening and removal of the accessory, and/or the force needed to press it on and take it off. The present invention aims to provide an accessory having a new and different type of fastening arrangement, which is simple, secure and does not have many parts.

SUMMARY OF THE INVENTION

In order to achieve the aforementioned objectives and according to a first aspect of the invention, an inventive arrangement for holding a device provided with a wristband, such as a wristop computer, attached to a handlebar, comprises a holder and a band of a stretchable material forming an elastic loop, and said holder comprises:

a plate-like middle portion having a flat surface on the top side to support the housing of said electronic device, and a first recess on the opposite bottom side for interfacing with a handlebar;

first and second bent outer portions attached to opposite ends of said middle portion adapted to support at least part of said wristband of said electronic device;

a pair of second recesses formed on the top side of said middle portion at said opposite ends between the middle portion and said outer portions, respectively; wherein said holder being attached to said handlebar with said first recess mating with the handlebar and the elastic strap loop wrapped around the handlebar with a first end fitted in a first recess and the other end of said strap fitted in the second recess of said pair of second recesses.

In practice, the pair of second recesses that are formed on the top side of the middle portion are running as trenches across the middle portion with respect to its more elongated dimension, and are preferably located approximately at the joint between the middle and the outer portions.

Said first and second outer portions may be curved downwards from the top side of the middle portion and towards backside and towards each other, to give the holder a C-like shape. The top of the middle portion may be designed as a mounting pad of a material that is softer than the holder, and the first recess for the handlebar may be provided with friction strips made of a material that is also softer than the holder. In some embodiments, the mounting pad and said friction strips may be formed in a molding step as a single integral part of the same material.

The various embodiments of the inventive arrangement and holder are specified in the appended claims.

DETAILED DESCRIPTION OF EMBODIMENTS

Figure 1:
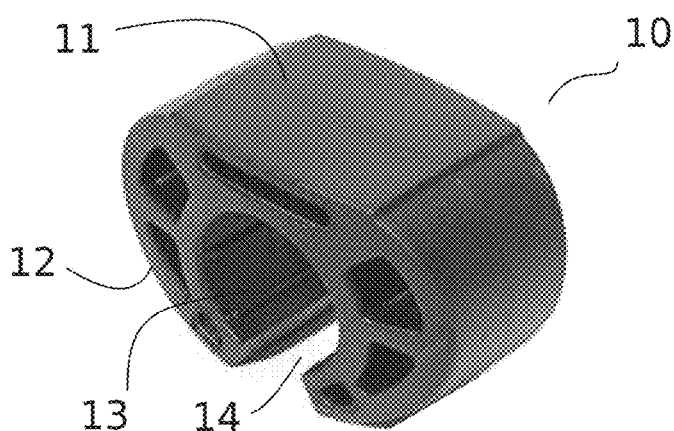
FIG. 1 shows an accessory according to prior art.

In FIG. 1 is shown an exemplary accessory 10 according to prior art. The accessory consists of an integral piece of rubber, elastomer or plastic material. It generally consists of a flat upper surface 11 intended to provide a base for the wearable device, and of two arms 12 encompassing a handle bar (not shown) that fits into the open-ended space 13 formed by arms 12. In order for the accessory to fit snugly and securely to a handlebar, the open end 14 of the bushing-like space 13 must be rather narrow. Also, the arms 12 need to be of considerable thickness in order for the accessory to provide an outer diameter that is sufficient for the wearable device to be tightly strapped around it. This means that a considerable amount of force is needed to press the accessory onto a handlebar and to remove it from there. Over time, due to the natural degradation of polymer materials and to wear caused by many assembly and removal operations, the surfaces and original resilience of the material becomes degraded and the accessory as a whole must be replaced.

Figure 2:
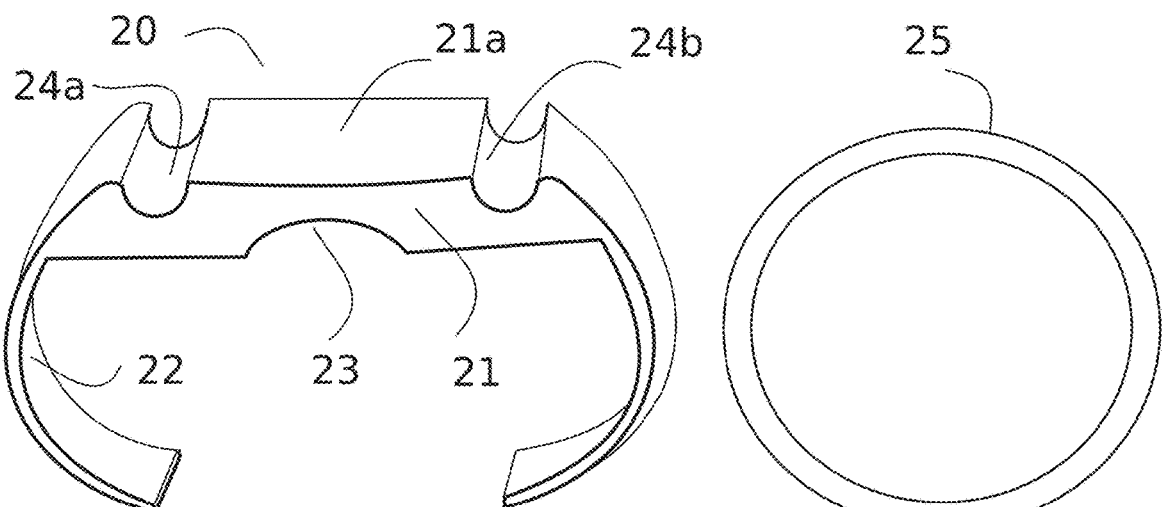
FIG. 2 shows an accessory according to the present invention.

In FIG. 2 is shown an embodiment of accessory according to the present invention. The inventive accessory comprises an arrangement with a holder 20 and a strap 25 of a stretchable material forming an elastic loop. The material of the strap loop 25 may be made of EPDM (ethylene propylene diene monomer) rubber or silicon, for example.

The holder 20 comprise a generally flat middle portion 21 and first and second bent outer portions 22 attached to opposite ends of the middle portion. Preferably, portions 21 and 22 are formed as an integral piece of a durable plastic material, such as polyamide (PA12, PA6, PA 6.6), for example. Typically these materials hardness is in the range of 60-85 on the Shore D scale.

The holder 20 is forming a structure aimed to receive a wearable device, such as a wristop computer (not shown) on the top side 21a of the middle portion 21 and to support the device on the middle portion and at least part of its wristband or wrist strap on the bent outer portions 22.

On the opposite side of the top side 21a of the middle portion 21, a first recess 23 is provided which runs across the holder 20 in a direction crosswise to the generally elongate dimension of the holder as formed by the joined middle and outer portions 21 and 22. The recess 23 is forming an interface with a handlebar to which the accessory is to be attached. It is to be noted that the recess does not need to nearly encompass the handlebar as in the prior art solution of FIG. 1.

On the top side 21a of the middle portion 21, where the middle portion is joined to the outer portions 22, are provided a pair of second recesses 24a and 24b, which are also formed in a direction crosswise to the generally elongate dimension of the holder. These second recesses are formed as trenches and intended to receive the elastic loop 25 when the holder 20 is fixed in place across the handlebar, whereby the elastic loop 25 rests in one recess 24a of the pair of second recesses, runs beneath the handlebar and is strapped to rest in the other recess 24b of the pair of second recesses.

Figure 3:
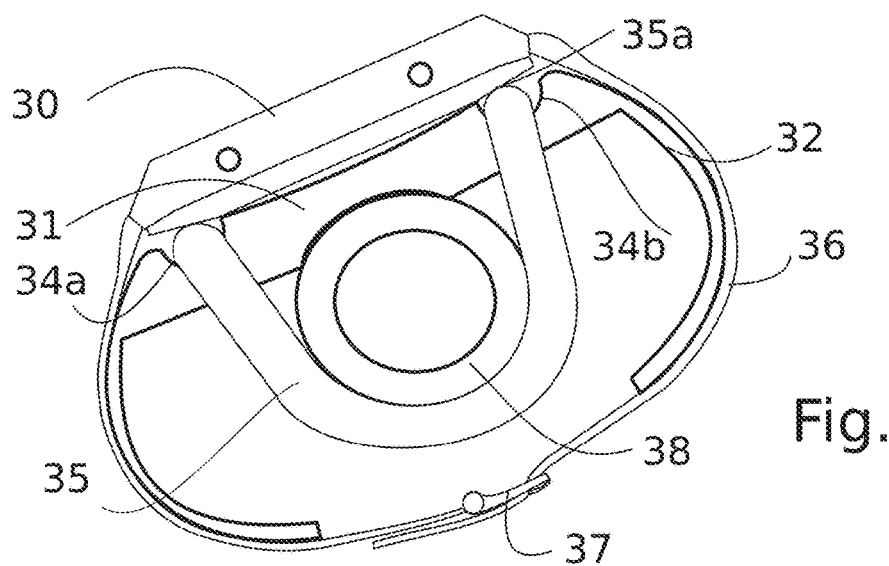
FIG. 3 shows an inventive accessory mounted.

Referring now to FIG. 3, the inventive arrangement of FIG. 2 is shown mounted on a handlebar 38 with a wristop computer 30 attached to the holder. The wristop computer 30 is placed on the top of the middle portion 31 of a holder 20 of FIG. 2, having its bent outer parts 32 encircled by the wristband or wrist strap 36 of the computer 30. The wristbands 36 regular fastening mechanism 37, a buckle or a clasp for example, is engaged in order to secure the wristop computer to the holder and keep it in the position as showed, with the computer resting firmly against the top surface of the middle portion 31.

In FIG. 3 is also shown how the elastic strap loop 35 is placed in the recess 34a on one side of the middle portion 31, drawn beneath the handlebar 38, and stretched upwards to reach the opposite recess 34b on the other side of the middle portion 31. The strap loop 35 also may provide friction at points 35a against the backside of the computer 30 case, helping to keep the computer firmly in place. This is a simple and efficient fastening arrangement. Should the strap loop 35 suffer from any damage, it is easy and economical to replace. The holder itself will not suffer from hardly any wear or other mechanical stress during use, mounting and removing from the handlebar, so it can be made lightweight with flexible outer parts 32 and designed to provide optimal support for the wristop computer 30.

Figure 4A:
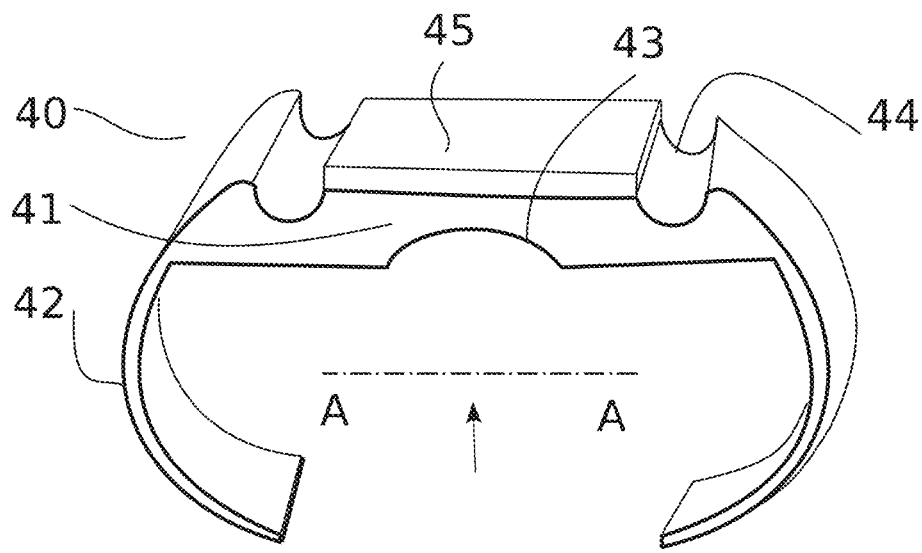
FIGS. 4A and 4B shows embodiments of the inventive accessory.
Figure 4B:
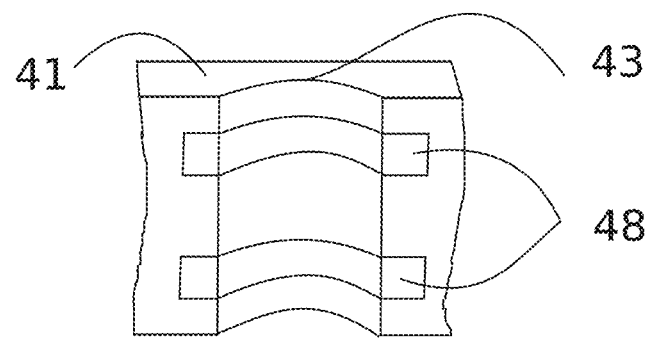

In FIGS. 4A and 4B is shown an embodiment of the inventive arrangement, where the holder 40 in FIG. 4A is provided with a middle portion 41 and bent outer portions 42, and additionally with a mounting pad 45 on top of the middle portion 41. The mounting pad 45 may be manufactured of a softer, foamed or solid, plastic material than the holder 40, to ensure a large contact surface and enough friction between the pad 45 and the bottom plate of the wristop computer. Suitable materials for the pad 45 may be chosen from various grades of polyurethane, such as rubberlike polyurethane, foamed polyurethane or thermoplastic polyurethane, such as Estane®, for example. Another suitable thermoplastic elastomer for this purpose is Kraiburg TPE Thermolast® K TC7PAZ, for example. Typically these materials hardness is in the range of 25-80 on the Shore A scale. The value 80 on the Shore A scale corresponds to approximately 30 on the Shore D scale.

In FIG. 4B is shown the projection A-A of FIG. 4A, where the recess 43 for the handlebar is provided with friction strips 48 manufactured of a softer plastic material than the holder 40 to ensure enough friction between the surface of the recess 43 and the handlebar 38 as shown in FIG. 3. Friction 48 strips may be manufactured from similar grades of polyurethane as the pad 45. Indeed, the pad 45 and friction strips 48 may be formed in a single insertion molding step as one shot of same material, for example.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures or characteristics may be combined in any suitable manner in one or more embodiments. In the description numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An arrangement for holding an electronic device provided with a wristband, such as a wristop computer, attached to a handlebar, the arrangement comprising a holder and a strap of a stretchable material forming an elastic strap loop, said holder comprising:
   a plate-like middle portion having a flat surface on the top side to support the housing of said electronic device, and a first recess on the opposite bottom side for providing a mating interface with a handlebar;
   first and second bent outer portions attached to opposite ends of said middle portion, said portions being curved downwards from the top side of the middle portion extending below said middle portion and towards each other in a C-shaped and flexible manner adapted to support at least part of said wristband of said electronic device; and
   a pair of second recesses formed on the top side of said middle portion at said opposite ends between the middle portion and said outer portions, respectively; wherein
said holder being attached to said handlebar with said first recess mating with the handlebar and the elastic strap loop wrapped around the handlebar with a first end fitted in a first recess of said pair of second recesses and the other end of said strap fitted in the second recess of said pair of second recesses.

2. The arrangement according to claim 1, wherein the top of the middle portion is a mounting pad made of a material that is softer than the holder.

3. The arrangement according to claim 1, wherein the middle portion in the recess for the handlebar is provided with friction strips made of a material that is softer than the holder.

4. The arrangement according to claim 1, wherein the top of the middle portion is a mounting pad made of a material that is softer than the holder, the middle portion in the recess for the handlebar is provided with friction strips made of a material that is softer than the holder and wherein said mounting pad and said friction strips are formed in a molding step as a single integral part of the same material.

5. The arrangement according to claim 1, wherein the first and second bent outer portions are arranged such that, when the arrangement is attached to the handlebar, the first and second bent outer portions do no interface with the handlebar.

* * * * *